Oct. 31, 1933.  G. P. DESPRET  1,933,167
GUIDING PLATES USED IN ROLLING MACHINES AND POURING TABLES
FOR MANUFACTURING PLATE GLASS AND THE LIKE
Filed Nov. 25, 1932   2 Sheets-Sheet 1
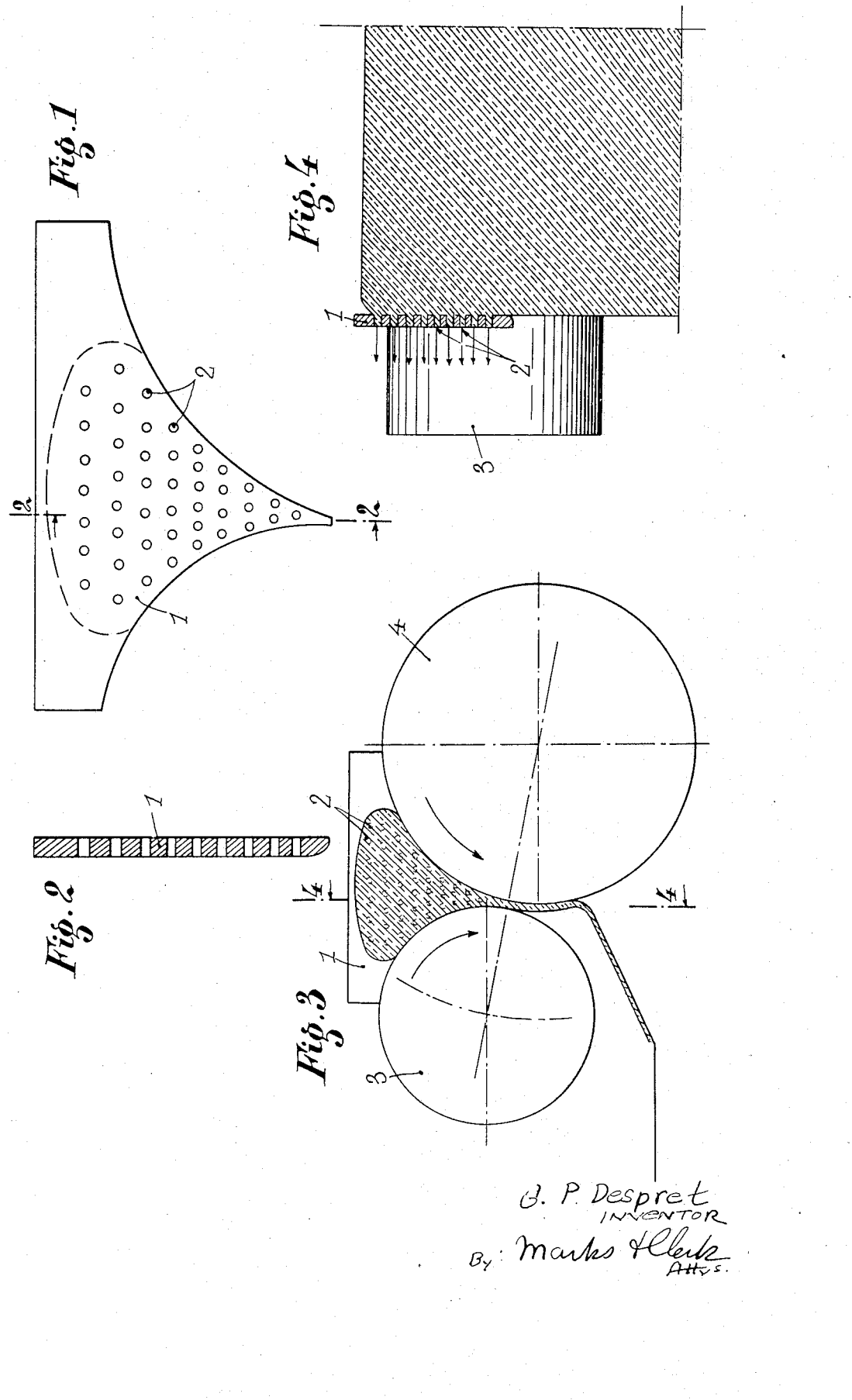

Oct. 31, 1933.  G. P. DESPRET  1,933,167
GUIDING PLATES USED IN ROLLING MACHINES AND POURING TABLES
FOR MANUFACTURING PLATE GLASS AND THE LIKE
Filed Nov. 25, 1932   2 Sheets-Sheet 2

G. P. Despret
INVENTOR
By Mark H Clark
ATTY.

Patented Oct. 31, 1933

1,933,167

UNITED STATES PATENT OFFICE 1,933,167

GUIDING PLATES USED IN ROLLING MACHINES AND POURING TABLES FOR MANUFACTURING PLATE GLASS AND THE LIKE

George Paul Despret, Paris, France, assignor to Compagnies Reunies Des Glaces & Verres Speciaux Du Nord De La France, Boussois-sur-Sambre, Nord, France Application November 25, 1932, Serial No. 644,368, and in France September 15, 1932

3 Claims. (Cl. 49—33)

The present invention relates to guiding plates used on the sides of rolling machines and pouring tables employed in the manufacture of plate-glass and ordinary window-glass, in order to obtain the desired width of the glass.

The operation of pouring the molten glass from a pot or ladle into a rolling machine or upon a pouring table, takes place in several stages.

In the first stage, the pot or the ladle is inclined in order to overcome the resistance of the glass which is due to its viscosity, in order that the glass may descend towards the receptacle adapted to receive the same. In the second stage, the pot or the ladle is entirely overturned in order that they may be as completely emptied as possible, and in the third stage, the pot or ladle is withdrawn out of the pouring plane.

As a result of this operation, the glass which is poured at different points of the pouring table or of the receptacle of the rolling machine will have different heights and widths. Immediately after the material has been poured, and by reason of the equilibrium of the masses, these various heights and widths will rapidly become equalized, since the glass has necessarily enough fluidity for allowing the same to be brought to the desired thickness in a perfect manner.

In this manner, the glass has a tendency to flow towards the parts which are less filled, and hence toward the guiding plates or side-plates, which determine the extreme limits of the rolling width. The moving glass will thus flow towards the guiding plates, and when it meets with these latter it will seek an additional exit for its discharge, but the rolling slot, whose width depends upon the thickness of the sheet of glass to be obtained, will afford no such additional exit. Hence the glass which flows towards the guiding plates is obliged to rise along these latter, whereon it is cooled, then drops upon the hotter glass which continues to flow towards the guiding plates, and so on. The glass, thus cooled against the guiding plates, determines accumulations of ripples within the mass of the hot glass and since this occurs along the edges of the glass sheet, it is required to cut off these edges, which is an expensive operation.

Attempts have been made to obviate these serious drawbacks by the use of guiding plates provided with sharp points, claws, or the like, however the results have not been quite satisfactory.

The present invention has for its object to devise a removable guiding plate for rolling machines and pouring tables, by which the aforesaid drawbacks will be entirely eliminated.

According to the invention, the guiding plate is pierced with a number of holes through which escapes the air, which the melted glass drives before it, said glass filling then the holes in which it becomes cooled and forms a thin layer which is not subject to displacement.

In the accompanying drawings, which are given by way of example:

Fig. 1 is a front view of a guiding plate pierced with holes.

Fig. 2 is a cross-section on the line 2—2 of Fig. 1.

Fig. 3 is a diagrammatic view of a rolling machine provided with guiding plates in conformity to the invention.

Fig. 4 is a section on the line 4—4 of Fig. 3.

In the form of construction shown in Figs. 1 and 2, the guiding plate 1 consists of a plate of refractory material which is pierced with holes 2. Said holes may have any suitable form, for instance round, as herein represented, square, rectangular, in the form of a chevron, or the like. The holes may be distributed in any manner, uniform or not; for instance, the spacing between the holes may increase from the bottom part to the top edge of the plate. The holes may also have the same transverse section or the section of said holes may vary on the surface of the plate. For instance the holes may be larger at the top of the plate than at the bottom of the same.

The outline of said plate will obviously depend upon the use to which it is intended. The plate having the form represented in Fig. 1 is adapted to rest upon one end of each roll 3—4 of the machine (Figs. 3 and 4), and a like plate is mounted at the other end of the rolls.

Figure 5:
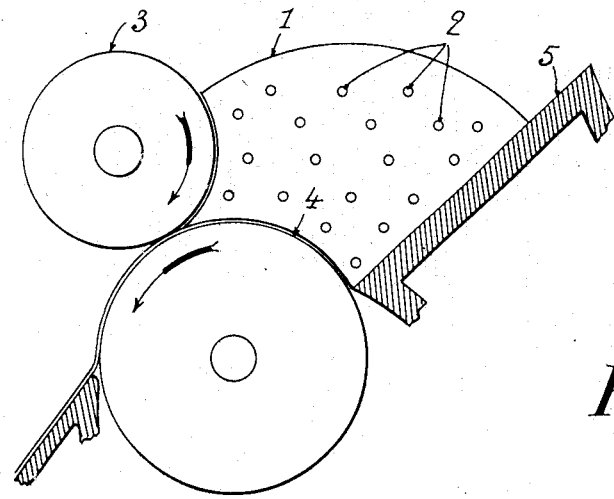
Fig. 5 shows a modified construction of an inclined rolling machine, provided with guiding plates in conformity to the invention.

Fig. 5 shows an inclined rolling machine provided at each end with a perforated guiding plate 1 resting upon the rolls 3—4 and also upon a table 5.

Figure 6:
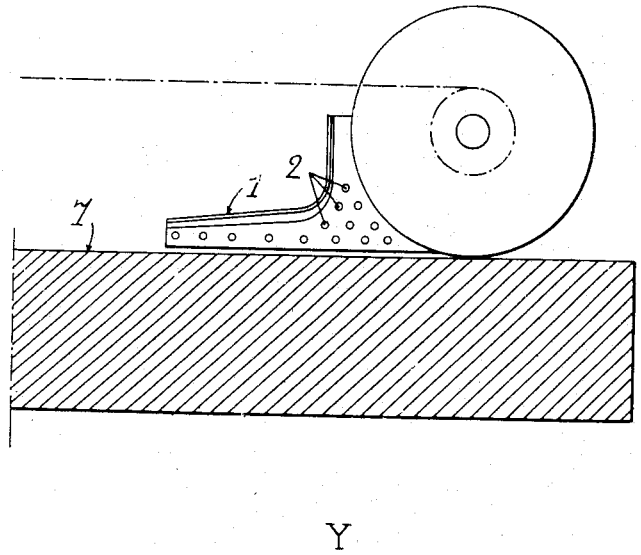
Fig. 6 is a diagrammatic lengthwise section of a pouring table, provided with guiding plates in conformity to the invention.

Fig. 6 represents a pouring table 7 which is provided near one of its ends, and upon both edges, with perforated guiding plates 1.

Figure 7:
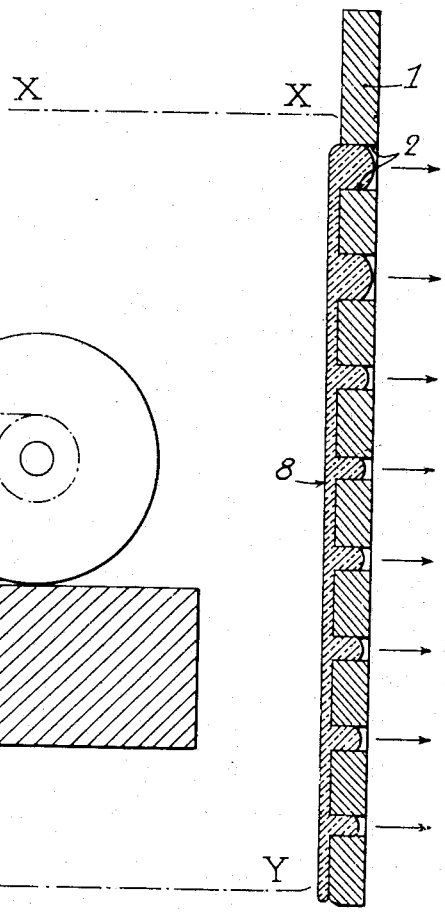
Fig. 7 is a section of a guiding plate, on a larger scale, showing the layer of glass which is held against it by means of its holes.

When the melted glass comes in contact with the said plate, it enters the holes 2, driving the air before it, so that the latter will no longer be retained within the mass of the glass. The glass closes the holes 2 as the glass rises in the receptacle, and clings to the plate while becoming cooled, thus slowly hardening into a thin layer 8 (Fig. 7) which can no longer move. In proportion as the glass is rolled out, the level of the glass descends from the level X—X to Y—Y in the receptacle and in like manner along the guiding plates (Fig. 7). A thin layer 8 will remain adhering to the plates.

The glass adapts itself along the guiding plates, in a uniform manner, to the thickness to be rolled, and the edges of the glass plates are perfectly straight and free from defects.

When the sheet has been entirely rolled, the two pouring plates are taken off, the glass adhering to them is removed, and the plates are now ready for the next operation.

Obviously, the said invention is not limited to the form of construction herein described and represented, which is given solely by way of example.

Having now described my invention what I claim as new and desire to secure by Letter Patent is:

1. In a rolling machine for manufacturing plate glass and the like, two rolls and two removable side closure plates pierced with perforations and resting upon said rolls at each end of the latter, the outer faces of said plates being exposed so that said perforations are open at both ends allowing the air, which is driven towards said plates by the mass of molten glass due to its lateral spreading, to directly escape to the atmosphere.

2. A rolling machine as claimed in claim 1, wherein the spacing of said perforations increases from the bottom to the top of said plates.

3. A rolling machine as claimed in claim 1, wherein the transverse section of each individual perforation decreases from the top to the bottom of said plates.

GEORGES PAUL DESPRET.